A. Douglass.

Making Track Irons.

No. 1,442. Reissued Mar. 31, 1863.

Witnesses;
J. D. Law
H. C. Wilson

Inventor;
Aaron Douglass

UNITED STATES PATENT OFFICE.

AARON DOUGLASS, OF PATERSON, NEW JERSEY.

IMPROVEMENT IN METHOD OF MAKING LAP JOINTS OF RAILWAY-RAILS.

Specification forming part of Letters Patent No. 29,631, dated August 21, 1860; Reissue No. 1,442, dated March 31, 1863.

*To all whom it may concern:*

Be it known that I, AARON DOUGLASS, of Paterson, county of Passaic, and State of New Jersey, have invented a new and improved process or method of forming the ends of railway-bars where a part or section of the end of one rail laps upon and into a part or section of the end of another rail, and makes a "lock-joint;" and I do hereby declare that the following is a full, clear, and exact description thereof, reference being had to the accompanying drawings, forming a part of this specification.

Figure 1:
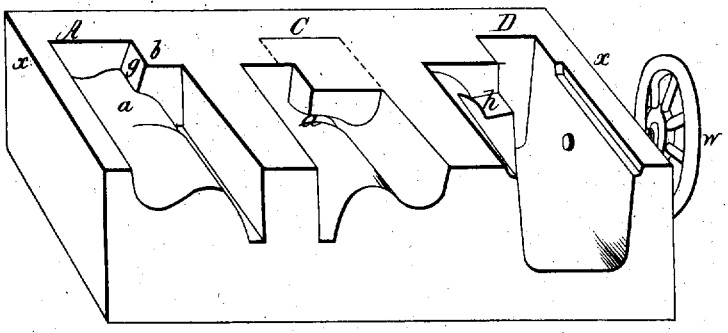
Figure 2:
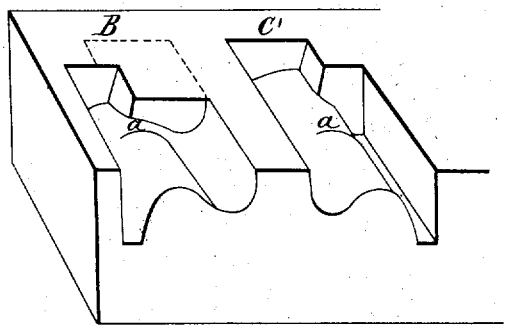
Figure 3:
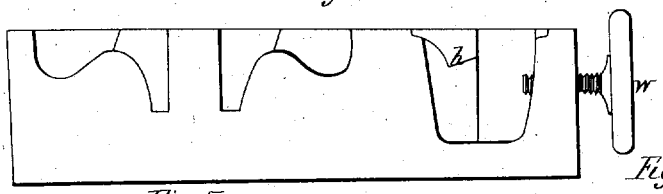
Figure 4:
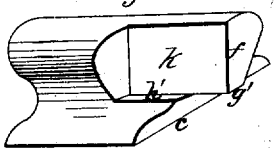
Figure 5:
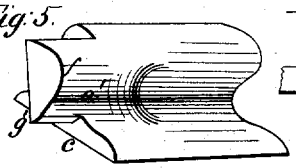
Figure 6:
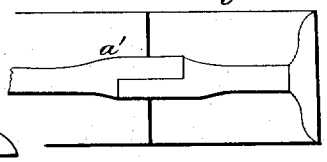
Figure 7:
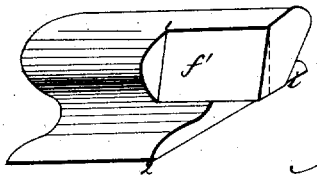

Figure 1 is an end view, taken in perspective, of the lower or base dies. Fig. 2 is a like view of the upper dies. Fig. 3 is a sectional view of Fig. 1 through *x x*. Figs. 4, 5 show the ends of the rail-bars as formed by the dies ~~shown in Figs. 1 and 2. Fig. 6 is a horizontal~~ section taken through two rails at their joints, showing the swelled neck of the rails at the joint as produced by my process. Fig. 7 is a perspective view of a piece of an ordinary T-rail, showing what parts are removed before it is subjected to the action of the dies.

Like letters in the several figures indicate like parts.

The object of my invention is to produce a simple and efficient means or process for shaping the ends of railway bars to form a compound lock-joint similar to that before referred to, and by which such a joint can be made much cheaper than by the means before resorted to—viz., drilling and chiseling, which was a slow and tedious process, and made the joints expensive; and also to give increased strength to the ends of the rails where they lap by and upon each other.

To enable others skilled in the art to fully understand my invention, I will proceed to describe its construction and operation.

A, Fig. 1, represents the lower or base die-block, made of suitable hard metal, and in which the figure of one-half of the end of a rail is cut in intaglio. The portion *a*, corresponding with the swelled neck of the rail, when finished, and as seen at *a'*, Figs. 5, 6, is depressed, while the portion of the die marked *b*, corresponding to the notch *c*, Figs. 4, 5, cut out from the bottom of the rail to form the lap *f*, is filled up so as to prevent the metal from spreading at that point when the dies are subjected to the blow of the trip or drop hammer or sledge. This die has also a beveled portion, *g*, which forms the inclined part *g'*, Figs. 4, 5, of the rail, and gives the desired shape to the lip of the rail.

The upper die-block, B, Fig. 2, has a flat portion, (indicated by dotted lines,) corresponding with and which forms the inside of the perpendicular lap *k*, Fig. 4. Such dies, by placing the ends of the rail therein after a part has been cut out, as hereinafter stated, and subjecting them to proper force from a hammer or sledge, form the lap and recess perfectly, with the exception of beveling or shaping the surface *h'* for securing or locking the joint against lateral thrust or motion. This is effected by the die-plate *h* that is placed in another mold, D, Fig. 1, which allows the end ~~of the rail with its swelled neck to be placed~~ in it in an inverted position, the base of the rail being uppermost, the part *h'* being over the die-plate *h*. The bottom of the rail is then struck smartly with a hammer and the surface or part *h* is given a beveled surface corresponding with that of the die-plate *h*. A clamping-screw, W, or wedge may be employed in this second operation for locking the rail laterally in a firm and rigid state while it receives the blow of the hammer.

The part *h* of the rail may be given any desired shape—as a half-round, or beveled in part and horizontal in part, or serrated—which will resist lateral thrust or motion by shaping the plate *h'* in the die of the desired form.

The two operations above described will suffice to form the complete and perfect lap-joint represented in Figs. 4, 5.

The dies C C', Figs. 1, 2, are for finishing the lap and recess, if for any reason they are not perfect when taken from the dies A and B. These dies C C' are, in fact, A and B reversed, and the rail end is simply turned over and placed in C, and the die C' placed on top, and then the two submitted to the blow.

In order to give a clearer understanding of the method of swaging the ends of T-rails like that shown in Fig. 7, so as to form the compound lap-joint with its several laps, vertical and inclined surfaces and swelled neck, I will describe the several stages of the process.

The ordinary T-rail is sawed out while hot, as follows: The piece *i i*, Fig. 7, is first cut out by a horizontal and vertical cut, and then the piece $f'$ is sawed out on a line drawn from (1) the center of the top of the rail to (2) the edge of the bottom, leaving a portion of the lap, which helps to form the joints when the two rails are brought together. This is all the sawing required. The length of the piece $f'$ is double that of the piece $i$ $i$. The end of the rail thus cut is first heated to the "welding-point," and placed in the base or lower die A, Fig. 1, with the sectional or full portion of the rail resting on the base of the bed or die and the surface of the lap, as sawed out, uppermost. The die-block or counter die, B, Fig. 2, is then placed over the rail end while it is in the lower die-block, and by giving it a smart blow from the steam or drop hammer or sledge the inclined surface $g$ of the die forms the inclined surface $g'$ on the bottom of the lap $f$, and at the same time the flat surface of the upper die block, and indicated by the dotted lines in B, Fig. 2, forms the recess $k$, Figs. 4, 5, and fills up the depression, $a$, Fig. 1, thus forming with the superfluity of metal, or that obtained from the recess $k$, and the extent of which is indicated by the dotted lines in Fig. 7, the swelled neck of the rail represented in Fig. 6. The rail is then removed after this operation from the dies and placed in the die D in an inverted position, the surface $h$ resting upon the inclined surface $h'$ of the die-plate when the rail is properly clamped and the required percussion force applied to the base of the rail to give the surface $h$ the proper inclination, as shown in Fig. 4. This completes the formation of the several surfaces and finishes one end of a rail-section. The same operation is repeated on each end of every rail-section. A complete and perfect lap-joint is thus produced in a simple, rapid, and efficient manner, and at the same time increased strength is given to the ends of the rails at their laps by the excess of metal being swaged into the swelled neck, as described.

By this swaging process in the formation of the lap-joint the metal at the ends of the rails is rendered somewhat more dense, and, by so much, stronger and less liable to injury from the jar and concussion occasioned by the passing of trains over the rails. The swelling of the neck of the rail also serves a very important purpose in giving increased strength to the rails at the joints by furnishing a support for the rail-table, and by adding more metal to the lapped portions of the rail, where it is most needed, not only for giving lateral but also vertical support to the rail-table at the junction of two rails.

The swelling of the neck of the ends of the rail besides giving increased strength to that part of the rail also renders the process of forming the laps by swaging easier and more rapid, because if no provision was made for the use of the excess of metal which now goes to form the swelled neck, it would require a much greater expenditure of time and power to swage and form the laps, if it could be done at all, with practical success.

Other kinds of rails than that commonly known as the T-rail, and as well those used for city railroads and light cars as those used for heavier transportation, may be swaged, substantially as before described, so as to form lap-joints, but the extent and form of the parts sawed out may require to be somewhat varied, as may also in some respects the form of the dies.

Having thus described my invention, what I claim as new, and desire to secure by Letters Patent, is—

1. The process, substantially as herein described, of making and shaping, by means of sawing and swaging combined, the ends of railway-bars, which form a lock-joint with each other by the end of one rail lapping upon and into the end of the other, substantially as set forth.

2. Swelling the neck of the ends of rail-bars where lapped upon each other, substantially as described, for the purpose of giving increased strength to the ends of such bars, for the purposes set forth.

AARON DOUGLASS.

Witnesses:
S. D. LAW,
J. C. WILSON.